United States Patent
Lee et al.

(10) Patent No.: US 8,582,070 B2
(45) Date of Patent: Nov. 12, 2013

(54) ARRAY SUBSTRATE FOR MULTI-VISION AND LIQUID CRYSTAL DISPLAY DEVICE INCLUDING THE SAME

(75) Inventors: Hwi-Deuk Lee, Gyeongsangbuk-do (KR); Jae-Seok Park, Daegu (KR); Kyung-Ha Lee, Changwon-si (KR); Dong-Seok Park, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 114 days.

(21) Appl. No.: 13/296,399

(22) Filed: Nov. 15, 2011

(65) Prior Publication Data
US 2012/0127405 A1 May 24, 2012

(30) Foreign Application Priority Data
Nov. 20, 2010 (KR) .................... 10-2010-0115913

(51) Int. Cl.
*G02F 1/1345* (2006.01)
(52) U.S. Cl.
USPC .................. 349/149; 349/150; 349/187
(58) Field of Classification Search
USPC ............. 349/158, 106, 187, 150, 73, 74, 139, 349/149, 151, 152, 153, 122; 257/59, 257/E33.003; 438/34
See application file for complete search history.

(56) References Cited

U.S. PATENT DOCUMENTS

| | | | |
|---|---|---|---|
| 6,055,030 A * | 4/2000 | Izumi | 349/73 |
| 6,407,360 B1 * | 6/2002 | Choo et al. | 219/121.67 |
| 2005/0270467 A1 * | 12/2005 | Lee | 349/152 |
| 2007/0085960 A1 | 4/2007 | Kim | |
| 2009/0201660 A1 * | 8/2009 | Kim | 361/818 |

FOREIGN PATENT DOCUMENTS

| | | |
|---|---|---|
| KR | 10-1999-0039460 A | 6/1999 |
| KR | 10-2004-0036153 A | 4/2004 |
| KR | 10-2007-0041219 A | 4/2007 |

OTHER PUBLICATIONS

Office Action dated Apr. 1, 2013 from the Korean Intellectual Property Office in counterpart Korean Application No. 10-2010-0115913.

* cited by examiner

*Primary Examiner* — Thoi Duong
(74) *Attorney, Agent, or Firm* — Morgan, Lewis & Bockius LLP

(57) ABSTRACT

An array substrate for a multi-vision liquid crystal display device includes a display region; and first to fourth non-display regions surrounding the display region, wherein the first and second non-display regions are opposite to each other and each include a data pad portion connected to a data line, and the third and fourth non-display regions are opposite to each other and each include a gate pad portion connected to a gate line, and wherein the display region is divided into two or four active regions with a seam region between the adjacent active regions, and the seam region has a first width.

16 Claims, 5 Drawing Sheets

ARRAY SUBSTRATE FOR MULTI-VISION AND LIQUID CRYSTAL DISPLAY DEVICE INCLUDING THE SAME

The present invention claims the benefit of Korean Patent Application No. 10-2010-0115913, filed in Korea on Nov. 20, 2010, which is hereby incorporated by reference for all purposes as if fully set forth herein.

BACKGROUND OF THE INVENTION

1. Field of the Invention

The present invention relates to an array substrate for multi visions, and more particularly, to an array substrate for multi-vision and a liquid crystal display device including the same.

2. Discussion of the Related Art

In general, a liquid crystal display (LCD) device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

FIG. 1A is a plan view illustrating an LCD device according to the related art, and FIG. 1B is a plan view illustrating a mother array substrate for an LCD device according to the related art. FIG. 1B shows printed circuit boards (PCBs) connected to non-display regions as well.

Referring to FIGS. 1A and 1B, the LCD device 1 includes a liquid crystal panel that includes a color filter substrate including a color filter, an array substrate 10 including gate and data lines and a pixel electrode, and a liquid crystal layer between the color filter substrate and the array substrate.

In upper and left non-display regions NA1 and NA4, respective gate and data pad electrodes, and gate and data link lines thereto are formed.

Further, in a display region DA, the gate lines connected to the gate pad electrodes through the gate link lines, and the data lines connected to the data pad electrodes through the data link lines are formed. The gate and data lines cross each other to define a pixel region.

Further, a thin film transistor is formed at the crossing portion of the gate and data lines, and the pixel electrode is formed in the pixel region and connected to a drain electrode of the thin film transistor.

The color filter substrate includes the color filter layer that includes red, green and blue color filter patterns corresponding to the respective pixel regions, a black matrix that corresponds to the gate and data lines and non-display regions NA1 to NA4 surrounding the display region DA, and a common electrode on the color filter layer and the black matrix.

A seal pattern is formed between the color filter substrate and the array substrate and along the non-display regions NA1 to NA4.

The LCD device further includes a backlight unit located below the liquid crystal panel to supply light, and driving portions coupled to the liquid crystal panel.

PCBs 50 are generally used for the driving portions, and include a gate PCB connected to the gate lines, and a data PCB 50 connected to the data lines.

The PCBs 50 are connected to the respective gate and data pads through respective tape carrier package (TCP) films or flexible printed circuit boards (FPCs) 61 and 62.

The gate PCB may not be used. In this case, the gate FPCs 61, where driving ICs 71 are mounted, are connected to the fourth non-display region NA4, where the gate pad electrodes are formed, and the data FPCs 62, where driving ICs 72 are mounted, are connected to the first non-display region NA1 where the data pad electrodes are formed.

The above-described LCD device is employed in various electronic devices such as TV, monitor, laptop computer, cellular phone, PDA and the like.

Large-sized display devices are recently needed, and, in response to the need, 40 or more inch LCD devices are produced. Further, 60 or more inch LCD devices are recently produced.

However, the 60 or more inch LCD device is very expensive compared to 20 to 40 inch LCD device, and a demand therefor is not much thus.

However, because demand therefor exits, an LCD manufacturer should produce the 60 or more inch LCD device. Several mask processes are performed to fabricate an LCD device, and the mask process needs a photo mask. Since the photo mask made of quartz is very expensive, buying a photo mask for one model causes increase of production cost.

Recently, since outdoor events are held, a multi-vision display device having a display region of 100 or more inches is needed as well.

The multi-vision display device uses a plurality of display devices each having a small-sized area. In this case, an interval between the display devices is great and needed to be less. The interval is referred to as a seam distance.

Referring to FIG. 1B, a mother array substrate 11 for fabricating an LCD device includes a plurality of pattern regions DP1 to DP4 that are each for a unit array substrate. In each unit array substrate, a data pad portion DPA connected to a data PCB 50 is formed at an upper side of a display region, and a gate pad portion GPA is connected to a gate PCB (not shown) is formed at a left side of the display region. In other words, for the convenience of fabrication and design, positions of the gate and data pad portions GPA and DPA are fixed at the left and upper sides, and the gate and data pad portions GPA and DPA are thus located corresponding to a center portion of the mother array substrate 11.

Accordingly, the above-configured mother array substrate 11 itself cannot be used for an multi-vision array substrate. Instead, the mother array substrate 11 is divided into the unit array substrates, then the unit array substrates are attached to respective color filter substrates with respective liquid crystal layer therebetween and respective LCD devices are thus fabricated, and then the LCD devices are assembled and form a multi-vision display device.

In this case, when four LCD devices are used to form the multi-vision display device, because of fixed positions of the PCBs, the PCBs should be arranged to be located at outsides of the multi-vision display device.

Accordingly, when an arrangement location of one of the LCD devices is determined, other LCD devices to be arranged at left, right, upper and lower sides of said one of the LCD devices should be turned over. For example, while a user sees a color filter substrate of said one of the LCD devices, the user faces array substrates of said other LCD devices. In this case, brightness difference between said one of the LCD devices and said other LCD devices occurs, and display quality of the multi-vision display device is degraded.

Further, while said one of the LCD devices has a color filter pattern sequence of R, G and B, said other LCD devices have the opposite color filter sequence of B, G and R. Accordingly, the two B color filter patterns are located at a boundary between said one of the LCD devices and the said other LCD devices, and this causes degradation of display quality of the multi-vision display device.

SUMMARY OF THE INVENTION

Accordingly, the present invention is directed to an array substrate for multi-vision and a liquid crystal display device including the same which substantially obviates one or more of the problems due to limitations and disadvantages of the related art.

An advantage of the present invention is to provide an array substrate for multi-vision and a liquid crystal display device including the same that can improve display quality.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, an array substrate for a multi-vision liquid crystal display device includes a display region; and first to fourth non-display regions surrounding the display region, wherein the first and second non-display regions are opposite to each other and each include a data pad portion connected to a data line, and the third and fourth non-display regions are opposite to each other and each include a gate pad portion connected to a gate line, and wherein the display region is divided into two or four active regions with a seam region between the adjacent active regions, and the seam region has a first width.

In another aspect, a multi-vision liquid crystal display device includes a first substrate that includes a display region and first to fourth non-display regions surrounding the display region; gate and data lines in the first substrate and crossing each other to define a plurality of pixel regions in the display region; a data pad portion in the first substrate, in the first and second non-display regions opposite to each other and connected to the data line; a gate pad portion in the first substrate, in the third and fourth non-display regions opposite to each other and connected to the gate line; a second substrate including a color filter layer and facing the first substrate; and a liquid crystal layer between the first and second substrates, wherein the display region is divided into two or four active regions with a seam region between the adjacent active regions, and the seam region has a first width.

In another aspect, a method of fabricating an array substrate for a multi-vision liquid crystal display device includes forming gate and data lines crossing each other to define a plurality of pixel regions and traversing a display region, wherein both ends of the data line are in first and second non-display regions, respectively, and both ends of the gate line are in third and fourth non-display regions, respectively, and wherein the first to fourth non-display region surround the display region; forming a data pad in each of the first and second non-display regions and connected to each of the both ends of the data line, and a gate pad in each of the third and fourth non-display regions and connected to each of the both ends of the gate line; forming a thin film transistor in the pixel region and connected to the gate and data lines, wherein a gate insulating layer is between the gate and data lines; and forming a pixel electrode in the pixel region and connected to a drain electrode of the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1A:
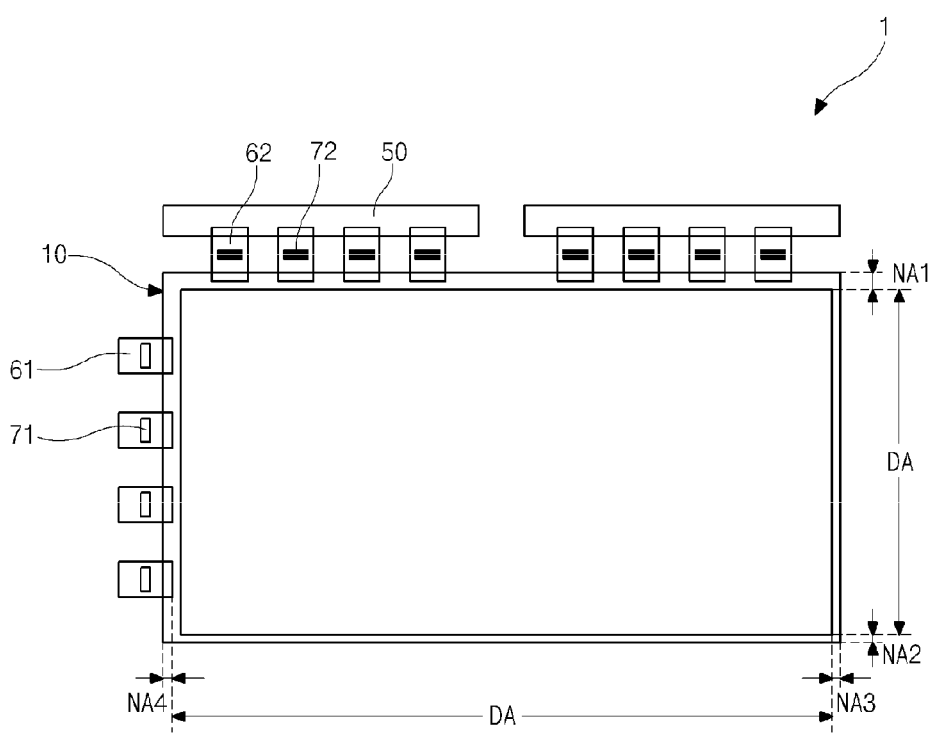
FIG. 1A is a plan view illustrating an LCD device according to the related art.
Figure 1B:
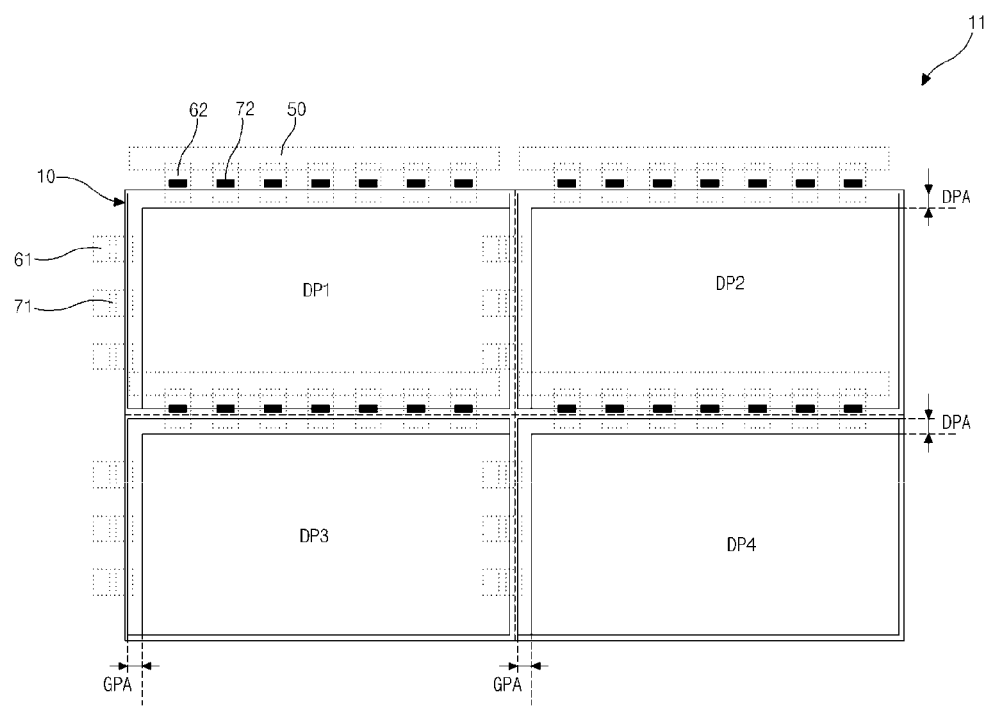
FIG. 1B is a plan view illustrating a mother array substrate for an LCD device according to the related art.
Figure 2:
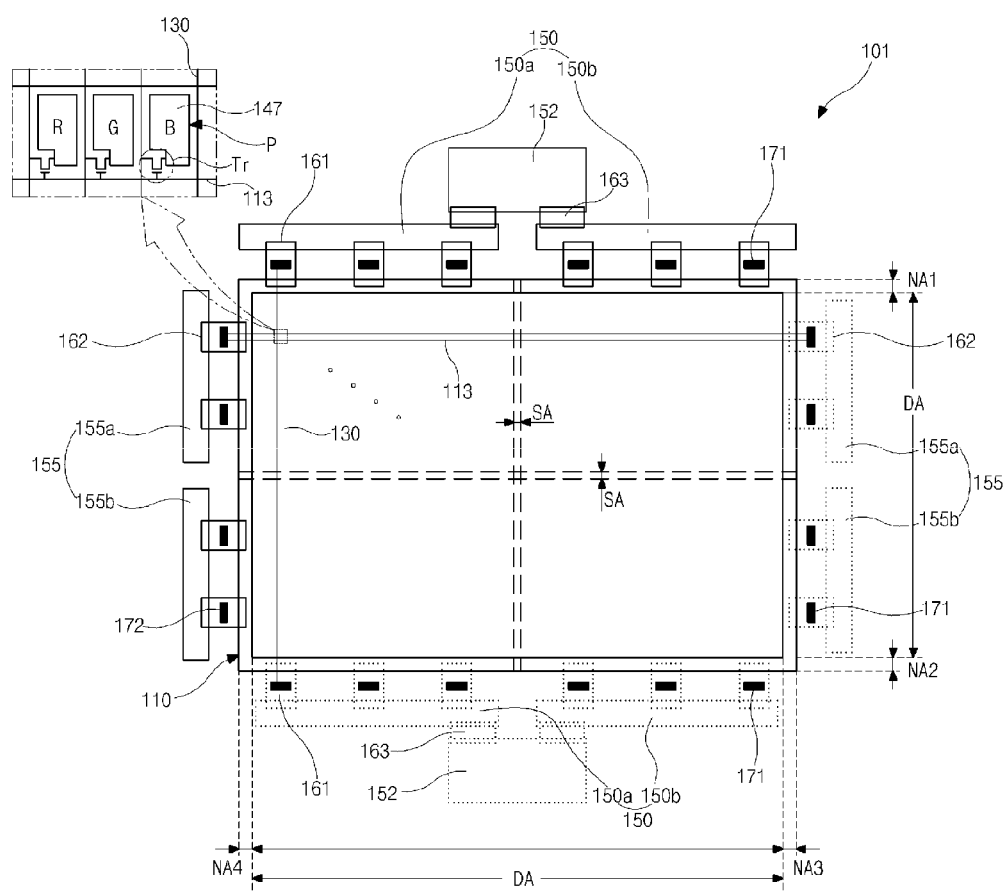
FIG. 2 is a plan view illustrating a multi-vision LCD device according to an embodiment of the present invention.

FIG. 2 is a plan view illustrating a multi-vision LCD device according to an embodiment of the present invention. For the purposes of explanation, an array substrate is mainly shown, a thin film transistor of each pixel region is briefly shown, and a state that FPCs and PCBs are connected is shown.

Referring to FIG. 2, an array substrate 110 for a multi-vision LCD device 101 includes a display region DA to display images, and 4 non-display regions NA1 to NA4 surrounding the display region DA.

Data driving circuit boards, for example, data PCBs 150 are connected to first and third non-display regions NA1 and NA3, where ends of data lines 130 are formed, among the non-display regions NA1 to NA4 through first flexible circuit films, for example, first FPCs 161. An IC 171 for data signal processing is mounted on the first FPC 161.

Gate driving circuit boards, for example, gate PCBs 155 are connected to second and fourth non-display regions NA2 and NA4, where ends of gate lines 113 are formed, through second flexible circuit films, for example, second FPCs 162. An IC 172 for gate signal processing is mounted on the second FPC 162.

The data PCBs 150 may include first and second data PCBs 150a and 150b. The gate PCBs 155 may include first and second gate PCBs 155a and 155b.

The array substrate 110 includes at least one seam region SA that has a width of about 2 mm to about 5 mm. The seam region SA is formed to secure a cutting region, and the array substrate 110 is cut along the cutting region and divided into 2 or 4 unit array substrates that are used for 2 or 4 LCD devices by being coupled to respective color filter substrates with a liquid crystal layer therebetween. The seam region SA traverses the display region DA.

Compared to the seam distance of about 5 mm to about 50 mm in the related art, the width (i.e., a seam distance) of the seam region SA of the embodiment is very small.

When the array substrate 110 is used as one for the multi-vision LCD device 101, the array substrate 110 is not cut and attached with a color filter substrate with a liquid crystal layer therebetween, and the liquid crystal layer completely covers the display region DA. Further, when the multi-vision LCD device is fabricated, the data PCB 150 may be coupled with one of the first and third non-display regions NA1 and NA3, for example, the first non-display region NA1, and the gate PCB 155 may be coupled with one of the second and fourth non-display regions NA2 and NA4, for example, the fourth non-display regions NA4. Then, a control circuit board 152, that includes a timing controller and the like, is connected with both of the first and second data PCBs 150a and 150b through third flexible circuit films, for example, third FPCs 162.

Gate and data pad portions formed at the non-display regions NA2 and NA3 other than the non-display regions NA1 and NA4 connected to the data and gate PCBs 150 and 155 are cut off and removed. Accordingly, the multi-vision LCD device 101 can have a narrow bezel.

The gate PCBs 155 are electrically connected through conductive lines, such as log lines, formed in the array substrate 110. Further, the gate PCBs 155 are electrically connected with the control circuit board 152 through conductive lines in the array substrate 110.

Through the above electrical connection of the data PCBs 150, gate PCBs 155 and the control circuit board 152, regions, for example, into which the display region DA are divided with respect to the seam region SA can display together an image for the multi-vision. The divided regions are active regions for image display.

In the embodiment, the non-display regions NA1 to NA4 are configured to be located around the display region DA so that the gate and data PCBs 155 and 150 are arranged around the multi-vision LCD device 101. This configuration can prevent problems of the related art multi-vision LCD device, such as brightness difference and continuous arrangement of same color pixels at a middle portion of the multi-vision LCD device, that are caused by a configuration that one of LCD devices constituting the multi-vision LCD device has a color filter substrate as a surface facing a user while other LCD devices are tuned over and have array substrates as surfaces facing the user because of fixed positions of gate and data pad portions. Further, the seam distance between adjacent vision regions is very short compared to the related art. Accordingly, display quality can be remarkably improved.

Figure 3A:
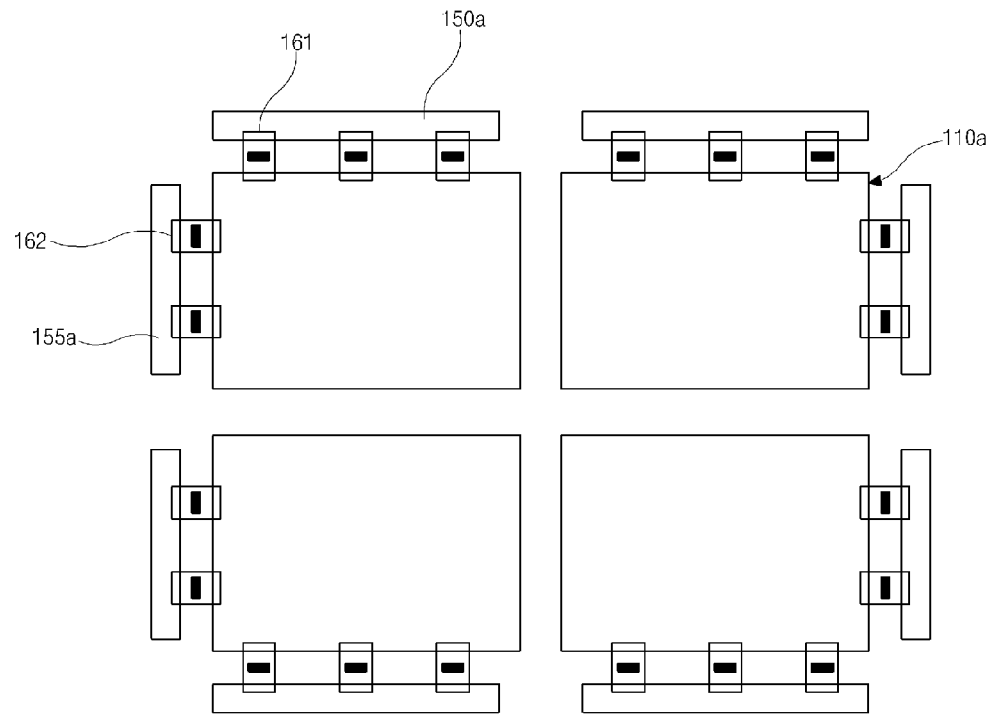
FIGS. 3A to 3C are plan views illustrating some examples of cutting the array substrate for the multi-vision LCD device into unit array substrates.
Figure 3B:
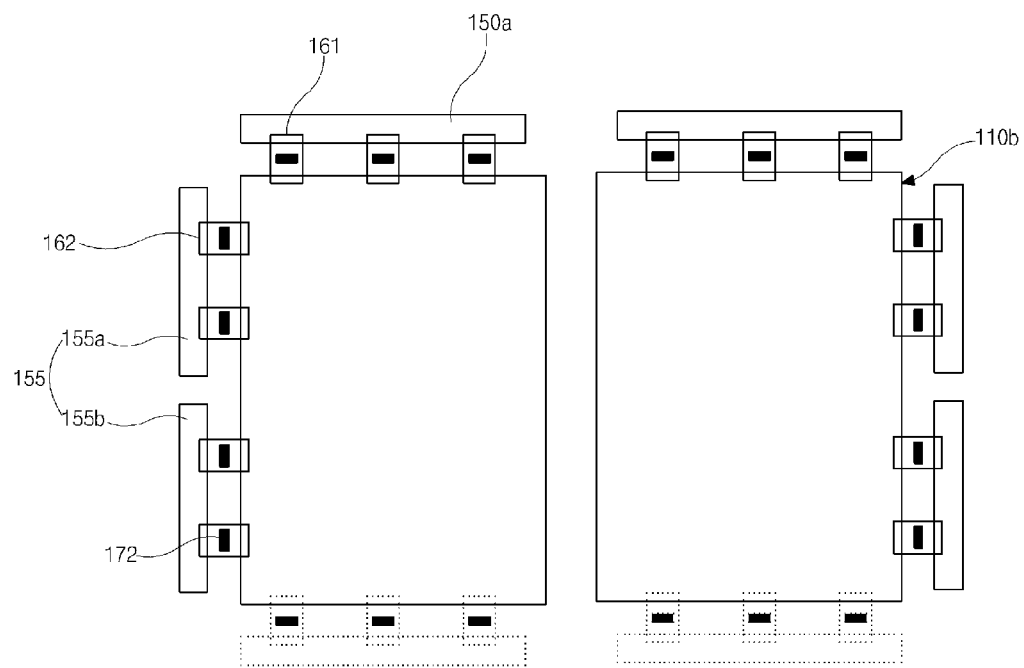
Figure 3C:
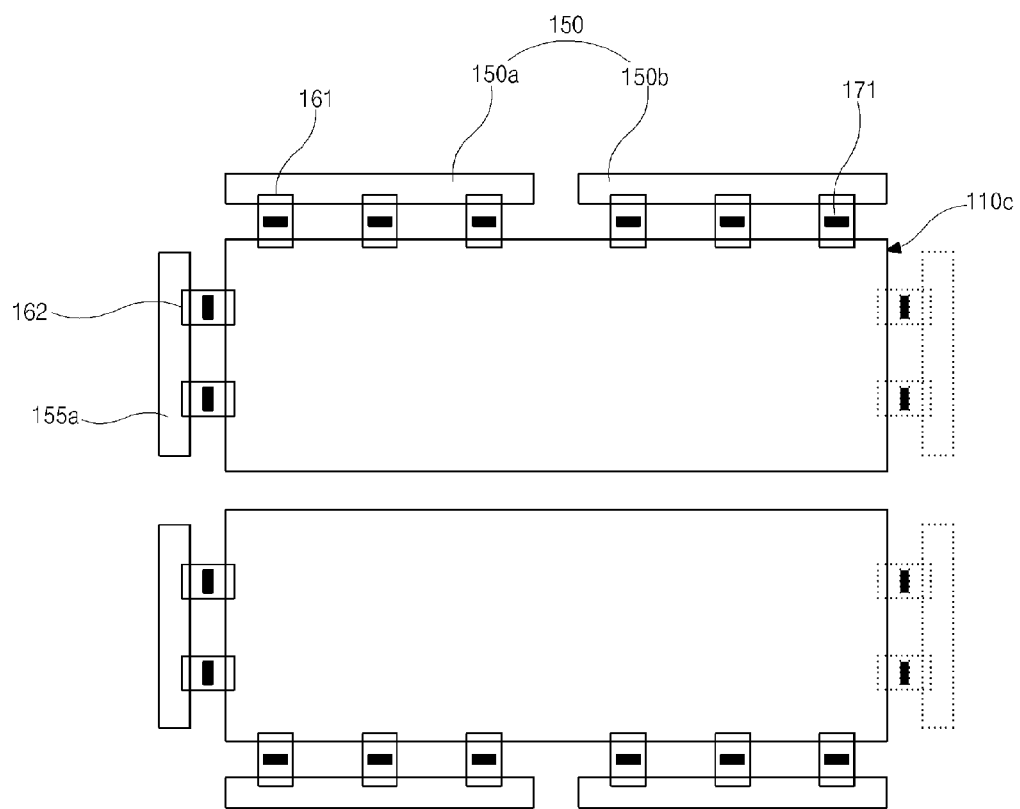

FIGS. 3A to 3C are plan views illustrating some examples of cutting the array substrate for the multi-vision LCD device into unit array substrates.

Referring to FIGS. 2 and 3A to 3C, the array substrate 110 for the multi-vision LCD device 101 can have gate and data pads in the four non-display regions NA1 to NA4. Accordingly, the data and gate PCBs 150 and 155 can be coupled with the non-display regions NA1 to NA4.

Accordingly, when the array substrate 110 is cut and divided into unit array substrates, for example, two or four unit array substrates 110a, 110b or 110c, each of the unit array substrates 110a, 110b or 110c has at least two non-display regions, which each are connected to the data or gate PCB 150 or 155, except for one or two side regions where the seam region SA is formed. Accordingly, the unit array substrates 110a, 110b and 110c are difference in size.

For example, suppose the array substrate 110 is a substrate for 37 inch wide (i.e., 16:9 aspect ratio) multi-vision LCD device. In this case, when the array substrate 110 is cut along the seam region SA into two, two unit array substrates 110b of FIG. 3B of 24 inch and 2:1 aspect ratio or another two unit array substrates 110c of FIG. 3C of 33 inch and 4:1 aspect ratio can be obtained. When the array substrate 110 is cut into four, four unit array substrates 110a of FIG. 3A of 19 inch and 16:9 aspect ratio can be obtained.

For another example, suppose the array substrate 110 is a substrate for 74 inch wide multi-vision LCD device. In this case, when the array substrate 110 is cut along the seam region SA into two, two unit array substrates 110b of FIG. 3B of 49 inch and 2:1 aspect ratio or another two unit array substrates 110c of FIG. 3C of 67 inch and 4:1 aspect ratio can be obtained. When the array substrate 110 is cut into four, four unit array substrates 110a of FIG. 3A of 37 inch and 16:9 aspect ratio can be obtained.

When the four unit array substrates 110a are formed through the cutting, data and gate PCBs 150 and 155 are connected to two non-display regions of each unit array substrate 110a, respectively.

When the two unit array substrates 110b or 110c are formed through the cutting, two data pad portions or two gate pad portions exist at opposite sides in each unit array substrate 110b or 110c. In this case, a non-display region including one of two gate pad portions or one of two data pad portions may be cut off and removed, and one gate pad portion and one data pad portion finally exist in each unit array substrate 110b or 110c. Then, data and gate PCBs 150 and 155 are connected to the corresponding non-display regions, which include the data and gate pad portions, respectively, of each unit array substrate 110b or 110c.

When the unit array substrate 110a, 110b or 110c is obtained through the cutting, a region, of the unit array substrate 110a, 110b or 110c, corresponding to the seam region SA is reduced by about a half of the size of the seam region SA. For example, the region of the unit array substrate 110a, 110b and 110c has a width of about 1 mm to about 2.5 mm. Accordingly, a unit LCD device using the unit array substrate 110a, 110b or 110c can have a narrow bezel about 3 mm or less wide.

A structure of a pixel region P in the display region DA of the array substrate 110 is explained as follows. The pixel region P includes a thin film transistor Tr connected to gate and data lines 113 and 130, and a pixel electrode 147 is connected to a drain electrode of the thin film transistor Tr.

Although not shown in the drawings, a common line may be formed parallel with the gate line 113.

When the common line is formed, the common line overlaps the pixel electrode 147 to form a storage capacitor. When the common line is not formed, the pixel electrode 147 overlaps a previous gate line to form a storage capacitor.

In the drawings, it is shown that the pixel electrode 147 has a plate shape. Alternatively, different types of pixel electrode may be used, for example, a plurality of bar-shaped pixel electrodes are arranged in the pixel region P and a plurality of bar-shaped common electrodes are arranged to alternate with the pixel electrode.

The thin film transistor Tr may include a gate electrode, a gate insulating layer, an active layer of intrinsic amorphous silicon, an ohmic contact layer of impurity-doped amorphous silicon layer, and source and drain electrodes that are sequentially laminated.

In the non-display regions NA1 to NA4, formed may be an auxiliary common line to connect common lines traversing the pixel regions P or to apply a common voltage to a common electrode in the color filter substrate, and a ground line to be connected with a ground terminal in the PCBs 150 and 155.

The array substrate includes at least two insulating layers including a gate insulating layer and a passivation layer. The gate line and the common line are below the gate insulating layer, and the data line is on the gate insulating layer. Accordingly, the auxiliary common line and the ground line in the second and fourth non-display regions NA2 and NA4, where the gate pads are formed, may be formed at a layer different from a layer, where the gate line is formed, for example, formed on the gate insulating layer or on the passivation layer. The auxiliary common line and the ground line in the first and third non-display regions NA1 and NA3, where the data pads are formed, may be formed at a layer not on the gate insulating, on which the data line is formed, for example, formed below the gate insulating layer or on the passivation layer. The auxiliary common line and the ground line may be electrically connected to corresponding components, which are required to be electrically connected to the auxiliary common line and the ground line, through a contact hole formed in the gate insulating layer or the passivation layer.

When the multi-vision LCD device 101 or a unit LCD device is fabricated using the array substrate 110, the array substrate 110 or the unit array substrate is coupled with a color filter substrate with a liquid crystal layer therebetween, and the non-display regions connected to the PCBs 150 and 155 are substantially not covered by the color filter substrate.

The color filter substrate includes a black matrix corresponding to a peripheral region of the pixel region P, and red (R), green (G) and blue (B) color filter patterns corresponding to respective pixel regions P.

When the plate-shaped pixel electrode 147 is used, a transparent common electrode covering the color filter patterns is formed all over the display region DA. When the bar-shaped pixel and common electrodes are used, an overcoat layer is formed on the color filter patterns.

As described above, in the array substrate of the multi-vision LCD device of the embodiment, the gate and data pads are formed in the corresponding ones of all the non-display regions surrounding the display region. Accordingly, any of the non-display regions can be used as one connected to the driving circuit board. Therefore, the multi-vision LCD device using the array substrate prevents brightness difference between the active display regions and can thus improve display quality.

Further, the seam distance is very reduced, and the display quality can thus be further improved.

Further, when the array substrate is not used for the multi-vision LCD device, the array substrate is cut into the unit array substrates and can be thus used for the unit LCD devices. In this case, various types of unit LCD devices, which are different in size, can be fabricated using the same photo mask, and production cost can thus be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for a multi-vision liquid crystal display device, the substrate comprising:
    a display region; and
    first to fourth non-display regions surrounding the display region,
    wherein the first and second non-display regions are opposite to each other and each include a data pad portion connected to a data line, and the third and fourth non-display regions are opposite to each other and each include a gate pad portion connected to a gate line,
    wherein the display region is divided into two or four active regions with a seam region between the adjacent active regions, and the seam region has a first width,
    wherein one of the first and second non-display regions is connected to a data driving circuit board through a first flexible circuit film that contacts the data pad portion,
    wherein one of the third and fourth non-display regions is connected to a gate driving circuit board through a second flexible circuit film that contacts the gate pad portion, and
    wherein the data pad portion of the other of the first and second non-display regions and the gate pad portion of the other of the third and fourth non-display regions are cut off and removed.

2. The substrate according to claim 1, wherein the gate driving circuit board includes first and second gate driving circuit boards, and the data driving circuit board includes third and fourth data driving circuit boards.

3. The substrate according to claim 2, wherein the first and second data driving circuit boards are connected to a control circuit board through a third flexible circuit film.

4. The substrate according to claim 1, wherein the first width is about 1 mm to about 5 mm.

5. The substrate according to claim 4, wherein when the array substrate is cut through the seam region, the array substrate is divided into two or four unit array substrates, and wherein each unit array substrate includes at least one non-display region including the gate pad portion and at least one non-display region including the data pad portion.

6. The substrate according to claim 5, wherein the display region includes a plurality of pixel regions defined by the gate and data lines that are below and on a gate insulating layer, respectively, and wherein the pixel region includes a thin film transistor connected to the gate and data lines and a pixel electrode connected to a drain electrode of the thin film transistor.

7. The substrate according to claim 6, wherein an auxiliary common line and a ground line are formed at a layer different from a layer where one of the gate line and the data line is formed on the first to fourth non-display regions.

8. A multi-vision liquid crystal display device, comprising:
    a first substrate that includes a display region and first to fourth non-display regions surrounding the display region;
    gate and data lines in the first substrate and crossing each other to define a plurality of pixel regions in the display region;
    a data pad portion in the first substrate, in the first and second non-display regions opposite to each other and connected to the data line;
    a gate pad portion in the first substrate, in the third and fourth non-display regions opposite to each other and connected to the gate line;
    a second substrate including a color filter layer and facing the first substrate; and
    a liquid crystal layer between the first and second substrates,
    wherein the display region is divided into two or four active regions with a seam region between the adjacent active regions, and the seam region has a first width,
    wherein one of the first and second non-display regions is connected to a data driving circuit board through a first flexible circuit film that contacts the data pad portion,
    wherein one of the third and fourth non-display regions is connected to a gate driving circuit board through a second flexible circuit film that contacts the gate pad portion, and wherein the data pad portion of the other of the first and second non-display regions and the gate pad portion of the other of the third and fourth non-display regions are cut off and removed.

9. The device according to claim 8, wherein the first to fourth non-display regions are not covered by the second substrate.

10. The device according to claim 9, wherein the gate driving circuit board includes first and second gate driving circuit boards, and the data driving circuit board includes third and fourth data driving circuit boards.

11. The device according to claim 10, wherein the first and second data driving circuit boards are connected to a control circuit board through a third flexible circuit film.

12. The device according to claim 8, wherein the first width is about 1 mm to about 5 mm.

13. The device according to claim 8, wherein the display region of the first substrate includes a gate insulating layer between the gate and data lines, a thin film transistor in the pixel region and connected to the gate and data lines, and a pixel electrode in the pixel region and connected to a drain electrode of the thin film transistor, and wherein the display region of the second substrate includes a black matrix corresponding to a peripheral portion of the pixel region, and a transparent common electrode covering the color filter layer.

14. The device according to claim 13, wherein an auxiliary common line and a ground line are formed at a layer different from a layer where one of the gate line and the data line is formed on the first to fourth non-display regions.

15. A method of fabricating an array substrate for a multi-vision liquid crystal display device, the method comprising:
forming gate and data lines crossing each other to define a plurality of pixel regions and traversing a display region, wherein both ends of the data line are in first and second non-display regions, respectively, and both ends of the gate line are in third and fourth non-display regions, respectively, and wherein the first to fourth non-display regions surround the display region;

forming a data pad portion in each of the first and second non-display regions and connected to each of the both ends of the data line, and a gate pad portion in each of the third and fourth non-display regions and connected to each of the both ends of the gate line;

forming a thin film transistor in the pixel region and connected to the gate and data lines, wherein a gate insulating layer is between the gate and data lines; and forming a pixel electrode in the pixel region and connected to a drain electrode of the thin film transistor, wherein one of the first and second non-display regions is connected to a data driving circuit board through a first flexible circuit film that contacts the data pad portion, wherein one of the third and fourth non-display regions is connected to a gate driving circuit board through a second flexible circuit film that contacts the gate pad portion, and wherein the data pad portion of the other of the first and second non-display regions and the gate pad portion of the other of the third and fourth non-display regions are cut off and removed.

16. The method according to claim 15, wherein the display region is divided into two or four active regions with a seam region between the adjacent active regions, and the seam region has a first width.

\* \* \* \* \*